Patented May 27, 1952

2,598,213

UNITED STATES PATENT OFFICE 2,598,213

PROCESS FOR PREVENTING CORROSION AND CORROSION INHIBITORS

Charles M. Blair, Jr., Webster Groves, Mo., assignor to Petrolite Corporation, Ltd., Wilmington, Del., a corporation of Delaware No Drawing. Application September 1, 1949, Serial No. 113,673

14 Claims. (Cl. 252—8.55)

This invention relates to the inhibition of corrosion of metals, and particularly to a composition for use in preventing corrosion of metals and particularly iron, steel, and ferrous alloys. The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. My inhibitors may, however, be used in other systems or applications. They appear to possess properties which impart to metals resistance to attack by a variety of corrosive agents, such as brines, weak inorganic acids, organic acids, $CO_2$, $H_2S$, etc.

I have discovered that the basic amides of polyamines containing two or more amino nitrogen atoms are particularly effective as corrosion inhibitors. Polyamines which are readily available as raw materials include ethylene diamine, diethylene triamine, tetraethylene pentamine, and triethylene tetramine. These are commonly referred to as ethylene polyamines and are considered as members of the broad class of alkylene polyamines. Ordinarily the word "polyamine" is employed to include diamines, as well as amines having three or more nitrogen atoms. Other examples of suitable polyamines include propylene diamine, dipropylene triamine, 1,3 diamino butane, polyamylene polyamine, and the like, all being typical alkylene polyamines.

The manufacture of such polyamines is well known. For instance, see U. S. Patent No. 1,951,992, dated March 20, 1934, to Perkins, and U. S. Patent No. 2,049,467, dated August 4, 1936, to Mnookin. As is well known, such compounds can be obtained by reactions involving reactants other than ethylene dichloride; for instance, propylene chloride or any higher alkylene dichloride may be employed.

Furthermore, as is well known, the formation of such polyamino compounds is not dependent upon the use of ammonia but may employ a primary amine. Obviously, the reaction may also employ a secondary amine; but the compound obtained solely from secondary amines, is valueless, because it cannot be acylated by an amidification reaction so as to yield an amide. One may, of course, employ mixtures of ammonia and primary amines. A secondary amine may be used in connection with ammonia or primary amines. As to other suitable reactants which may be substituted for ethylene dichloride in the manufacture of such polyamines, one may include the following: proplyene dichloride, butylene dichloride, amylene dichloride, etc.

For the sake of simplicity I will limit my description to the particular species derived from polyamines obtained by reactions involving ethylene dichloride. Broadly speaking, this class may be typified by the following formula:

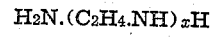

$$H_2N.(C_2H_4.NH)_xH$$

where $x$ is a whole number, varying from 1 to 10, and preferably 2 to 4. The best and most effective inhibitors are obtained when $x$ equals 2 or 3.

As has been previously stated, the compounds contemplated for use as inhibitors are characterized by the presence of an acyl radical in an amide form. The acyl radical may be derived from any suitable high molecular weight carboxy acid. The expression "higher molecular weight carboxy acids" is an expression frequently employed to refer to certain organic acids, particularly monocarboxy acids, having more than 6 carbon atoms and generally less than 40 carbon atoms. The commonest examples include the detergent-forming acids, i. e,. those acids which combine with alkalies to produce soap or soaplike bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including capyrlic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acd, ricinostearolic acid, ricinoleyl lactic acid, acetylricinoleic acid, chloracetylricinoleic acid, linoleic acid, linolenic acid, lauric acid, myristic acid, undecyclenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow soyabean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic, aliphatic and fatty acids, such as dihydroxystearic acid, dihydroxy palmitic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic; aralkyl and aromatic acids, such as benzoic acid, Twitchell fatty acids, naphthoic acid, carboxy-diphenyl pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

In all instances the reactant employed to introduce an acyl radical from a higher molecular weight carboxy acid need not be the acid itself, but may be the ester, anhydride, amide, or any other suitable form.

The acylated polyamines of the kind herein contemplated as corrosion inhibitors must have present at least one strongly basic amino nitrogen atom, and preferably has present at least two strongly basic amino nitrogen atoms. It is known that nitrogen atoms which are directly linked to an aryl radical or to an acyl radical are substantially non-basic in character and ordinarily do not show any marked solubility in acid. Actually, aryl amines in general show weakly basic properties, but for the present discussion they may be considered as substantially non-basic. On the other hand, amino nitrogen atoms not directly linked to an acyl group and not directly linked to an aryl group, may be either strongly basic or mildly basic. The mildly basic amino radicals are characterized, of course, by freedom from directly linked aryl radicals and acyl radicals, but are characterized by being linked to a hydroxy hydrocarbon radical, such as an alkylol radical, or an esterified alkylol radical or its equivalent, including morpholine radicals. A strongly basic amino nitrogen atom, in many instances, may be characterized as being of the following type:

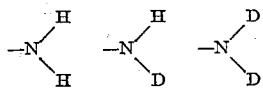

in which D represents a non-aryl hydrocarbon radical and is not intended to include oxyhydrocarbon radicals, or acylated oxyhydrocarbon radicals. Furthermore, DD jointly is not intended to represent a morpholine nucleus.

Thus, the compounds of the type herein contemplated must have present at least one strongly basic amino nitrogen atom. There must be present at least one amido nitrogen atom in which the acyl radical of the amide group is derived from a higher molecular weight carboxy acid of the kind above described. It is not intended to include the type of compound in which there are other amino nitrogen atoms which either are non-basic in character, such as a radical derived from an aryl amine, or which may be mildly basic in character, such as a radical derived from an alkylolamine or an esterified alkylolamine. There may be present non-basic amido radicals other than the kind described, to wit, amido radicals derived, for example, from an acid having less than 6 carbon atoms, as, for example, acetic acid, butyric acid, and the like.

However, regardless of the presence or absence of such other radicals, the acylated polyamine must always contain at least two amino nitrogen atoms, the word "amino" being employed in the broad sense in this instance to include both amino nitrogen atoms and amido nitrogen atoms; and at least one amino nitrogen atom must be of the strongly basic type, and preferably there should be present at least two amino nitrogen atoms of the strongly basic type. At least one amido nitrogen atom must be linked to the acyl radical derived from a high molal carboxy acid. There is no intention to exclude the presence of more than one acyl radical derived from such higher molecular weight carboxy acid. Furthermore, it is to be noted that it is my preference to obtain such acyl radicals from monocarboxy detergent-forming acids of the kind above mentioned; and more particularly, I prefer to employ the fatty acid type.

Summarizing what has been said, the commonest type of acylated polyamine may be indicated by the following type formula:

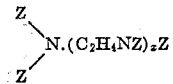

in which $x$ is a small whole number, such as one or more, as previously indicated; and Z is H, RCO, R'CO, or D, in which RCO represents an acyl radical derived from a higher molecular weight carboxy acid, and must occur at least once; and R'CO is an acyl radical derived from a lower molecular weight carboxy acid having six carbon atoms or less; D is an alkyl radical. Said amide is further characterized by the fact that at least one of the following radicals is present:

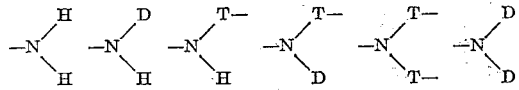

in which T is an alkylene radical; and D has its prior significance; and preferably at least two of the aforementioned basic amine radicals are present.

In view of what has been said previously, it is understood that in the broader aspect, the class which has just been described is a member of the genus in which any alkylene group such as propylene, butylene, amylene, or the like, may appear instead of the ethylene group. With this in mind, the previous formula may be rewritten as follows:

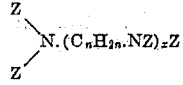

in which $n$ represents a relatively small number varying from 2 to 10, and in which all the other characters have their previous significance.

In the prior formula it is pointed out that Z may represent the radical D, which in turn is an alkyl radical. Dependent on the method of manufacture, a polyamine may contain an alkyl radical as produced. In other words, it may be derived from a primary or secondary amine, so as to have an alkyl radical present without necessity of a separate step for producing such alkyl radicals. For instance, the reaction involving an alkylene dichloride on one hand and a mixture of a secondary amine, and ethylene diamine, or the like, on the other hand, would produce a mixture of compounds, part of which would consist of a polyamine of the kind herein contemplated; and such polyamine would be additionally characterized by the presence of at least one amino nitrogen atom connected to two alkyl radicals. However, if desired, the polyamines as available can be alkylated in the manner commonly employed for alkylating ordinary amines, i. e., monoamines or diamines. For instance, alkylated products may be derived by reaction between alkyl chlorides, such as methyl chloride, propyl chloride, butyl chloride, amyl chloride, cetyl chloride, octadecyl chloride, and the like in conjunction with the selected polyamine. Such reaction products result in the formation of hydrochloric acid, and the resultant product consists of an amine hydrochloride. The conventional method for conversion into the base is to treat with dilute caustic solution. Alkylation is not limited to the introduction of an alkyl group; but as a matter of fact, a radical may be introduced characterized by the fact that the carbon atom chain is interrupted at least once by an oxygen atom. In other words, alkylation may be accomplished by compounds which are essentially alkyloxyalkyl chlorides, as, for example, the following:

$CH_3OC_2H_5Cl$   $C_2H_5OC_2H_5Cl$
$C_2H_5OC_3H_7Cl$   $C_6H_{13}OC_6H_{13}Cl$

Similarly, chlorhydrins are available from polyglycerol, such as diglycerol and some polyglycols, such as diglycols, which are characterized by the fact that the carbon atom chain is interrupted more than once by oxygen. The compounds obtained by the introduction of such radicals which contain a carbon atom chain interrupted at least once by oxygen, are very similar to the compounds obtained by the introduction of alkyl groups. Therefore, for the sake of brevity, reference in the hereto appended claims to an alkyl group is intended to include within such expression oxyhydrocarbon radicals of the kind just described, to wit: those in which the carbon atom chain is interrupted at least once by oxygen; but it is not intended to contemplate compounds of the type in which the carbon atom chain is interrupted more than twice by an oxygen atom.

As a matter of common knowledge, reactions involving ammonia and an alkylene dichloride probably go through an intermediate stage, which involves a formation of an aminoalkyl halide. As a result, one has a procedure whereby instead of substituting an alkyl radical for an amino hydrogen atom, one can substitute an aminoalkyl radical. For analogous reactions see U. S. Patent No. 2,014,077, dated September 10, 1935, to Wilson. Thus, what has been previously stated may be modified in the following respect: D, in addition to being an alkyl radical, may also be an aminoalkyl radical.

I have found that the most desirable corrosion inhibitors for my process are obtained by the use of detergent-forming acids of the kind described; and I have particularly found that fatty acids represent the most desirable type of detergent-forming acids. The following are examples of chemical compounds intended to be used as corrosion inhibitors in practising or carrying out my process.

*Example 1*

283 parts of stearic acid amide are heated with 438 parts of triethylene tetramine for 10 hours to about 130° C. until a test portion is soluble in diluted hydrochloric acid; at the end of the reaction the pressure is preferably lowered to about 15 mm. Hg. Thereby 380 parts of a product probably corresponding to the formula $C_{17}H_{35}CONH(C_2H_4NH)_2C_2H_4NH_2$ (monostearyl triethylene tetramine) are obtained.

*Example 2*

281 parts of oleic acid amide yield with 584 parts of triethylene tetramine, when heated for 10 hours to about 130° C., 400 parts of a product which is soluble in diluted hydrochloric acid and probably corresponds to the mono-oleyl triethylene tetramine.

*Example 3*

283 parts of stearic acid amide are heated in the same way as described in Examples 1 and 2 with 400 parts of a mixture of polyalkylene polyamines obtainable by heating ethylene dichloride with ammonia under pressure and removing any ethylene diamine formed during the latter reaction. After distilling the excess of bases under reduced pressure, 430 parts of a paste are obtained which is soluble in diluted acids.

*Example 4*

300 parts of ricinoleic acid amide yield with 400 parts of a mixture of bases according to Example 3, when heated to about 8 hours to 150–160° C., 450 parts of a mixture of acylated bases which is easily soluble in diluted acetic or hydrochloric acid.

*Example 5*

From 300 parts of ricinoleic acid amide and 400 parts of a mixture of polyalkylene polyamines according to Examples 3 and 4, by heating for several hours to 150° C., simultaneously passing a current of dry air free from $CO_2$, and finally removing the excess of bases partly by distilling under reduced pressure, and partly by washing with water, there are obtained 430 parts of a mixture of polyalkylene polyamines, which is acylated by the radicals of ricinoleic acid.

*Example 6*

100 parts by weight of olive oil and 100 parts by weight of diethylenetriamine are heated to about 180–200° C. until a test portion of the reaction mixture is soluble in dilute hydrochloric acid. After distilling off the excess of diethylenetriamine, advantageously under reduced pressure, there remains a strongly viscous mass, the hydrochloric acid solution of which has great foam forming properties.

A similar product is obtainable by heating free oleic acid with a large excess of diethylenetriamine under the same conditions.

*Example 7*

310 parts by weight of the ethyl ester of oleic acid are heated with 286 parts by weight of triethylenetetramine at about 160° C. for 12 hours when a homogeneous solution is formed; the alcohol formed and the excess of triethylenetetramine are distilled off. The residual reaction product forms a brown oil, which is difficulty soluble in water and readily soluble in alcohol, benzene and dilute hydrochloric acid.

A quite similar product is obtainable by heating free oleic acid with an excess of triethylenetetramine to about 180–200° C. and distilling off the excess of triethylenetetramine under reduced pressure.

Example 8

200 parts by weight of olive oil are heated at 180–200° C. with 300 parts by weight of a mixture of bases, which is obtained by the action of ammonia on ethylene chloride at 80–120° C. under pressure of 10 atm. and after distilling off the ethylene diamine, said mixture of bases boiling at about 15 mm. mercury between 90 and 300° C. When a test portion of the reaction product is smoothly soluble in dilute hydrochloric acid the water formed and the excess bases are distilled off under reduced pressure and a yellowish brown oil is obtained, a solution of which in dilute hydrochloric acid can be used as a washing or wetting agent.

Example 9

350 grams of monostearin and 300 grams of triethylenetetramine are heated together at 200° C. for three to four hours and then the displaced glycerin and the excess triethylenetetramine were washed out with water and the resulting product dried.

Example 10

In the prior examples tetraethylene pentamine is substituted for the amines employed in the prior examples by using a suitable molecular equivalent, but without increasing the amount of fatty acid compound employed.

Example 11

Purified naphthenic acids derived from Gulf coast crudes are employed in various examples preceding.

Example 12

Carboxy acids derived from oxides of Pennsylvania crude oil and having approximately 10–14 carbon atoms per mole of fatty acid, are substituted in the previous examples.

Example 13

284 parts of stearic acid, 86 parts of 70% aqueous ethylene diamine and 300 parts of o-xylene are mixed, and heated at the reflux temperature under a reflux condenser carrying a water trap. Heating is continued until 44 quarts of water have been collected. The o-xylene is then removed by distillation under a partial vacuum to yield a waxy, solid amide, sparingly soluble in dilute hydrochloric and dilute acetic acids.

Example 14

74 parts of 1,2-propylene diamine are substituted for the ethylene diamine of Example 13. Heating is continued until 18 parts of water are collected.

Although effective corrosion inhibitors result from reaction of a diamine with a carboxylic acid of the kind described, as for example in Examples 13 and 14 above, I find that somewhat more effective products, that is, products yielding protection at lower concentrations, result from use of polyamines containing 3 or more amino groups, particularly when only one of these groups is converted into an amide group. Therefore, a preferred class of amino-amides for use in my process is that group derived from polyamines containing 3 or more amino groups and containing, after the amide forming reaction, at least one, and preferably two or more free amino groups.

As has been previously stated, one may use a suitable carboxy acid or its equivalent, such as an ester, amide, anhydride, acyl chloride, or the like. The acylated polyamine of the kind described may be used as such, or may be used in the form of a salt, such as a hydrochloride, the acetate, or the like.

It is to be understood that the invention herein contemplated is concerned with the use of a particular type of compound or compounds as corrosion inhibitor, and is not concerned with the particular means or method employed in the manufacture of said compound or compounds. The methods previously described are those which are most readily employed, and which have been most completely described in the manufacturing art pertaining to such compounds. However, as will be readily apparent to a skilled chemist, other manufacturing procedures may be conveniently employed. Furthermore, it is known that one can obtain symmetrically alkylated alkylene diamines, for instance, symmetrical dibutyl ethylene diamine. Such product can be acylated, for example, by reaction with oleic acid to produce mono-oleyl dibutyl ethylene diamine. Various other methods readily suggest themselves, although obviously, one would ordinarily employ the most economical and feasible method.

It is to be understood that the compound herein contemplated may be manufactured in any suitable manner; and one is not dependent upon following the exact procedure previously outlined. In certain instances other reactants might be employed, or else reactants of the kind previously described might be combined in some other manner, it is not intended that the hereto appended claims be limited in any manner whatsoever as to the method of manufacture, unless such method is specifically recited.

Although I have described the corrosion inhibitors of my process as acylated polyamines, I may, in many instances, employ these compounds in the form of their salts, either with organic or inorganic acids. Being relatively strong bases, and in many instances containing more than one basic nitrogen, the acylated amines may combine with acids, not only to form mono-salts but to form di- or polysalts. Examples of acids which may be used to form such salts are hydrochloric acid, sulfuric acid, acetic acid, oxalic acid, maleic acid, oleic acid, abietic acid, phosphoric acid, petroleum sulphonic acid, naphthenic acid, rosin, phenylacetic acid, benzoic acid, and the like.

Salts of the acylated polyamines, such as those above described, appear to be equally as effective as the free bases. Probably, in the dilute solutions in which they are employed as corrosion inhibitors, the salts hydrolyze or otherwise decompose to some extent and reach an equilibrium with the acids and other constituents of the corrosion medium.

Particularly effective compositions for use in the present process are those formed by neutralizing or partially neutralizing the acylated polyamine with an acid such as acetic or hydrochloric acid and dissolving this salt in an aromatic or semi-aromatic solvent such as "aromatic gas oil." A small amount of a lower molal alcohol containing less than 10 carbon atoms such as isopropanol or n-butanol may also be added. The resulting solutions are readily soluble or dispersible in crude oil and water and are, therefore, particularly applicable to the protection of oil and gas well systems. Solutions containing from 15% to 75% of acylated polyamine are preferred.

The method of carrying out my process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e. g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The amount of corrosion preventive agent required in my process varies with the corrosiveness of the system, but where a continuous or semi-continuous treating procedure is carried out as described above, the addition of reagent in the proportion of from one part per 1,000 to one part per 20,000 or more parts of corrosive fluid will generally provide protection.

The protective action of the herein described reagents appears to be maintained for an appreciable time after treatment ceases, but eventually is lost unless another application is made.

For the protection of gas wells and gas-condensate wells, the amount of corrosion inhibitor required will usually be within range of one-half to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less aminoamide than usually would be required for neutralization of the acids produced.

Having thus described my invention, what I claim as new and desire to secure by Letters Patent is:

1. A process for preventing corrosion of metals comprising applying to the metal a compound of the kind selected from the class consisting of the following type formula:

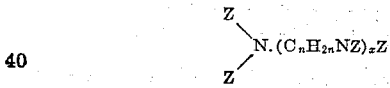

in which $n$ represents a small whole number varying from 2 to 10; $x$ is a small whole number varying from 1 to 10; Z is H, RCO, R'CO, or D, in which RCO represents an acyl radical derived from a higher molecular weight carboxy acid and must occur at least once; R'CO is an acyl radical derived from a lower molecular weight carboxy acid having six carbon atoms or less; and D is a radical selected from the class consisting of alkyl radicals and aminoalkyl radicals; and said amide is further characterized by the fact that there must be at least one occurrence of one of the following radicals:

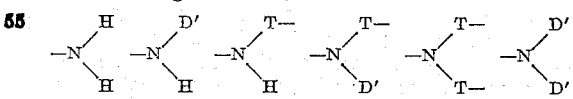

in which T is an alkylene radical and D' is an alkyl radical.

2. A process for preventing corrosion of metals comprising applying to the metal a strongly basic acylic amino amide containing at least two and not more than 11 amino nitrogen atoms; containing at least one amido group and not more amido groups than the number of amino nitrogen atoms present, minus one; the acyl radical of said amido group being the acyl radical of a higher molecular weight carboxy acid; and the alkylene radicals containing at least 2 and not over 10 carbon atoms.

3. A process for preventing corrosion of metals comprising applying to the metal a strongly basic acylic amino amide containing at least 2 and not more than 11 amino nitrogen atoms; containing at least one amido group and not more amido groups than the number of amino nitrogen atoms present, minus one; the acyl radical of said amido group being the acyl radical of a detergent-forming monocarboxy acid; and the alkylene radicals containing at least 2 and not more than 10 carbon atoms.

4. A process for preventing corrosion of metals comprising applying to the metal a strongly basic polyalkylene polyamino amide containing at least 3 and not more than 11 amino nitrogen atoms; containing at least one amido group and not more amido groups than the number of amino nitrogen atoms present, minus two; the acyl radical of said amido group being the acyl radical of a detergent-forming monocarboxy acid; and the alkylene radicals containing at least 2 and not over 10 carbon atoms.

5. A process for preventing corrosion of metals comprising applying to the metal a strongly basic polyalkylene polyamino amide containing at least 4 and not more than 6 amino nitrogen atoms; containing at least one amido group and not more amido groups than the number of amino nitrogen atoms present, minus two; the acyl radical of said amido group being the acyl radical of a detergent-forming monocarboxy acid; and the alkylene radicals containing at least 2 and not over 10 carbon atoms.

6. A process for preventing corrosion of metals comprising applying to the metal a strongly basic polyalkylene polyamino amide containing at least 4 and not more than 6 amino nitrogen atoms; containing at least one amido group and not more amido groups than the number of amino nitrogen atoms present, minus two; the acyl radical of said amido group being the acyl radical of a detergent-forming monocarboxy acid; and the alkylene radicals containing at least 2 and not over 4 carbon atoms.

7. A process for preventing corrosion of metals comprising applying to the metal a strongly basic polyethylene polyamino amide containing at least 4 and not more than 6 amino nitrogen atoms; containing at least one and not more amido groups than the number of amino nitrogen atoms present, minus two; the acyl radical of said amido group being the acyl radical of a detergent-forming monocarboxy acid.

8. A process for preventing corrosion of metals comprising applying to the metal a strongly basic polyethylene polyamino amide containing at least 4 and not more than 6 amino nitrogen atoms; containing at least one and not more amido groups than the number of amino nitrogen atoms present, minus two; the acyl radical of said amido group being the acyl radical of a detergent-forming monocarboxy acid; and said acyl radical being derived from a fatty acid having at least 8 and not more than 32 carbon atoms.

9. A process for preventing corrosion of metals comprising applying to the metal a strongly basic polyethylene polyamino amide containing at least 4 and not more than 6 amino nitrogen atoms; containing at least one and not more amido groups than the number of amino nitrogen atoms present, minus two; the acyl radical of said amido group being the acyl radical of a detergent-forming monocarboxy acid; and said acyl radical being derived from an unsaturated fatty acid having at least 8 and not more than 32 carbon atoms.

10. A process for preventing corrosion of metals comprising applying to the metal a strongly basic polyethylene polyamino amide containing at least 4 and not more than 6 amino nitrogen atoms; containing at least two and not more amido groups than the number of amino nitrogen atoms present, minus two; the acyl radical of said amido groups being the acyl radical of a detergent-forming monocarboxy acid; and said acyl radical being derived from an unsaturated fatty acid having at least 8 and not more than 32 carbon atoms.

11. A process for preventing corrosion of metals comprising applying to the metal a strongly basic acylation derivative of triethylene tetramine containing two unsubstituted amino groups and 2 amide groups, in which the acyl radicals of said amido groups are the acyl radicals of an unsaturated fatty acid having at least 8 carbon atoms and not more than 32 carbon atoms.

12. A process for preventing corrosion of metals comprising applying to the metal a strongly basic amidification derivative of tetraethylene pentamine containing at least one and not more than 4 amido groups, with the remaining amino groups being unsubstituted, in which the acyl radicals of said amino groups are the acyl radicals of an unsaturated fatty acid having at least 8 and not more than 32 carbon atoms.

13. A process for preventing corrosion of metals comprising applying to the metal a strongly basic amidification derivative of pentaethylene hexamine containing at least one and not more than 5 amido groups, with the remaining amino groups being unsubstituted, in which the acyl radicals of said amino groups are the acyl radicals of an unsaturated fatty acid having at least 8 and not more than 32 carbon atoms.

14. The process of preventing corrosion of oil and gas well equipment which comprises injecting into the well a compound of the kind selected from the class consisting of the following type formula:

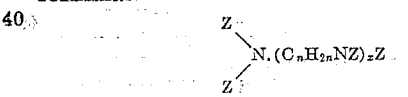

in which $n$ represents a small whole number varying from 2 to 10; $x$ is a small whole number varying from 1 to 10; $Z$ is H, RCO, R'CO, or D, in which RCO represents an acyl radical derived from a higher molecular weight carboxy acid and must occur at least once; R'CO is an acyl radical derived from a lower molecular weight carboxy acid having six carbon atoms or less; and D is a radical selected from the class consisting of alkyl radicals and aminoalkyl radicals; and said amide is further characterized by the fact that there must be at least one occurrence of one of the following radicals:

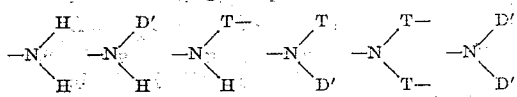

in which T is an alkylene radical and D' is an alkyl radical.

CHARLES M. BLAIR, Jr.

REFERENCES CITED

The following references are of record in the file of this patent:

UNITED STATES PATENTS

| Number | Name | Date |
| --- | --- | --- |
| 2,407,703 | Kaplan | Sept. 17, 1946 |
| 2,426,338 | Blair | Aug. 26, 1947 |
| 2,466,517 | Blair et al. | Apr. 5, 1949 |
| 2,468,163 | Blair et al. | Apr. 26, 1949 |
| 2,486,249 | Bird | Oct. 25, 1949 |